(12) United States Patent
Wang et al.

(10) Patent No.: US 10,331,491 B2
(45) Date of Patent: Jun. 25, 2019

(54) VIRTUAL DATA CENTER RESOURCE MAPPING METHOD AND DEVICE

(71) Applicants: Huawei Technologies Co., Ltd., Shenzhen (CN); University of Electronic Science and Technology of China, Chengdu (CN)

(72) Inventors: Jiao Wang, Munich (DE); Cheng Zuo, Chengdu (CN); Hongfang Yu, Chengdu (CN)

(73) Assignees: Huawei Technologies Co., Ltd., Shenzhen (CN); University of Electronic Science and Technology of China, Chengdu (CN)

( * ) Notice: Subject to any disclaimer, the term of this patent is extended or adjusted under 35 U.S.C. 154(b) by 113 days.

(21) Appl. No.: 15/619,178

(22) Filed: Jun. 9, 2017

(65) Prior Publication Data
US 2017/0277575 A1    Sep. 28, 2017

Related U.S. Application Data (63) Continuation of application No. PCT/CN2015/087386, filed on Aug. 18, 2015.

(30) Foreign Application Priority Data

Dec. 12, 2014    (CN) .......................... 2014 1 0767633

(51) Int. Cl.
*G06F 9/46* (2006.01)
*G06F 9/50* (2006.01)
(Continued)

(52) U.S. Cl.
CPC ........ *G06F 9/5077* (2013.01); *G06F 9/45558* (2013.01); *G06F 9/5066* (2013.01);
(Continued)

(58) Field of Classification Search
CPC .. G06F 9/5077; G06F 9/45558; G06F 9/5066; H04L 29/08; H04L 47/82; H04L 67/10
See application file for complete search history.

(56) References Cited

U.S. PATENT DOCUMENTS 8,555,274 B1 * 10/2013 Chawla ................. G06F 9/5077
                                                        718/1
9,389,894 B1 *  7/2016 Zhang .................. G06F 9/45558
(Continued)

FOREIGN PATENT DOCUMENTS

| CN | 102609295 A | 7/2012 |
| CN | 102929687 A | 2/2013 |

(Continued)

OTHER PUBLICATIONS

Fuerst et al., "On the Benefit of Collocation in Virtual Network Embeddings," 2012 IEEE 1st International Conference on Cloud Networking (CLOUDNET), Short-Paper post track, pp. 161-163, Institute of Electrical and Electronics Engineers, New York, New York (2012).

(Continued)

*Primary Examiner* — Camquy Truong
(74) *Attorney, Agent, or Firm* — Leydig, Voit & Mayer, Ltd.

(57) ABSTRACT

A virtual data center (VDC) resource mapping method and device. The method includes: a) receiving a VDC resource request, where the VDC resource request carries a virtual machine distribution identifier, and the virtual machine distribution identifier is used to indicate a maximum quantity K of virtual machines that can be borne by a single physical server; b) selecting, from an unmapped virtual machine set Q in the VDC resource request, M virtual machines to form a partition P; c) selecting a target physical server that can provide a physical resource required by the partition P, and mapping the partition P to the target physical (Continued)

server; and d) removing, from the set Q, the M virtual machines on which resource mapping has been performed, and repeatedly performing steps b), c), and d) until no virtual machine on which resource mapping has not been performed exists in the set Q.

18 Claims, 6 Drawing Sheets

(51) Int. Cl.
*H04L 29/08* (2006.01)
*G06F 9/455* (2018.01)
*H04L 12/911* (2013.01)

(52) U.S. Cl.
CPC .............. *H04L 29/08* (2013.01); *H04L 47/82* (2013.01); *H04L 67/10* (2013.01); *G06F 2009/4557* (2013.01); *G06F 2009/45595* (2013.01); *Y02D 10/22* (2018.01); *Y02D 10/36* (2018.01); *Y02D 50/10* (2018.01)

(56) References Cited

U.S. PATENT DOCUMENTS

| | | |
|---|---|---|
| 2010/0100888 A1 | 4/2010 | Tene et al. |
| 2012/0296585 A1 | 11/2012 | Chen et al. |
| 2012/0297379 A1* | 11/2012 | Anderson ........... G06F 9/45558 718/1 |
| 2013/0174152 A1* | 7/2013 | Yu .......................... G01R 21/00 718/1 |
| 2014/0047201 A1 | 2/2014 | Mehta |
| 2014/0215073 A1 | 7/2014 | Dow et al. |

FOREIGN PATENT DOCUMENTS

| | | |
|---|---|---|
| CN | 103560967 A | 2/2014 |
| CN | 103823541 A | 5/2014 |
| CN | 104468803 A | 3/2015 |

OTHER PUBLICATIONS

Guo et al., "SecondNet: A Data Center Network Virtualization Architecture with Bandwidth Guarantees," CoNEXT 2010, ACM, Philadelphia, USA (Nov. 30-Dec. 3, 2010).

* cited by examiner

VIRTUAL DATA CENTER RESOURCE MAPPING METHOD AND DEVICE

CROSS-REFERENCE TO RELATED APPLICATIONS

This application is a continuation of International Application No. PCT/CN2015/087386, filed on Aug. 18, 2015, which claims priority to Chinese Patent Application No. 201410767633.5, filed on Dec. 12, 2014. The disclosures of the aforementioned applications are hereby incorporated by reference in their entireties.

TECHNICAL FIELD

Embodiments of the present disclosure relate to the cloud computing field, and in particular, to a virtual data center (VDC) resource mapping method and device.

BACKGROUND

In the cloud computing era, with increasing computing requirements of the society, a scale of a data center also rapidly expands. However, for a huge data center, average utilization of data center resources is relatively low, and most devices are idle. This causes a heavy energy consumption burden to the data center. How to reduce energy consumption of a data center is a current severe challenge to a data center. Currently, in a data center, a virtualization technology is used, such that energy consumption of the data center can be effectively reduced, and data center resource utilization can be increased. A virtual data center is a service type of a flexible self-service that is formed on the basis of a cloud computing service and that provides rapid deployment, a real-time response, immediate lease, allocation on demand, and dynamic resource extension. Under this new trend, a resource request of each tenant may be abstracted into a virtual data center (Virtual Data Center, VDC for short) constituted by a group of virtual machines (Virtual Machine, VM for short), and each VM is corresponding to specified resources (including a CPU, a memory, a hard disk, and the like). In addition, for transfer of data and an object file, a communications link with guaranteed bandwidth also needs to be established between VMs, so as to satisfy a requirement of communication between the VMs. Because VM arrangement is tightly coupled with a route for VM communication bandwidth, a process of mapping a VDC to a bottom-layer physical network becomes very complex. A VDC mapping problem refers to a problem about how to fully utilize physical network resources when a VDC is mapped to a physical network.

In the VDC mapping process, main factors to be considered include reliability, bandwidth consumption, and energy consumption of physical facilities. Current VDC mapping may be classified into the following two cases: In a first case, all VMs in a VDC are evenly allocated to each physical server, so as to achieve minimum impact between the VMs, and implement load balancing between bottom-layer physical facilities; in a second case, VMs in a VDC are deployed as many as possible in one physical server, so as to minimize link consumption between the VMs. During VDC mapping, from a perspective of energy consumption and bandwidth consumption, all VMs in a VDC need to be integrated to the most extent, to occupy as few physical servers as possible. In this way, bandwidth consumption between servers is reduced, and another unused physical server may be disabled, thereby achieving an objective of energy saving. However, VM integration may cause low reliability of a VDC, and a failure of one physical server may cause a large-scale VDC failure. From a perspective of reliability, VMs in a VDC need to be scattered. Obviously, energy saving and reliability are two contradictory indicators. An existing mapping algorithm cannot well resolve the VDC mapping problem.

SUMMARY

In view of this, embodiments of the present disclosure provide a virtual data center (VDC) resource mapping method and device, so as to implement a function of properly allocating resources in a case of minimizing energy consumption overheads of infrastructure and satisfying reliability, to provide an optimum trade-off among reliability, resource utilization, and system energy consumption overheads.

According to a first aspect, an embodiment of the present disclosure provides a virtual data center (VDC) resource mapping method, including:

step 202: receiving a VDC resource request, where the VDC resource request carries a quantity of requested virtual machines and a virtual machine distribution identifier, the quantity of the requested virtual machines is used to indicate a total quantity A of virtual machines requested for resource mapping, and the virtual machine distribution identifier is used to indicate a maximum quantity K of virtual machines that are in the VDC resource request, on which resource mapping needs to be performed, and that can be borne by a single physical server; where the VDC resource request includes a virtual machine request, and a virtual machine and physical machine hybrid request;

step 204: selecting, from an unmapped virtual machine set Q in the VDC resource request, M virtual machines to form a partition P; where the unmapped virtual machine set Q is a set of virtual machines on which resource mapping has not been performed and that are in the A virtual machines requested for resource mapping, and an initial value of M is a natural number greater than 1 and less than or equal to K;

step 206: selecting a target physical server that can provide a physical resource required by the partition P, and mapping the partition P to the target physical server; where the physical resource includes at least one of the following: a remaining capacity of a virtual machine that can be borne by a server, a CPU, a magnetic disk, a memory, a network, an operating system, a physical link, and the like; and step 208: removing, from the unmapped virtual machine set Q, the M virtual machines on which resource mapping has been performed, and repeatedly performing steps 204, 206 and 208 until no virtual machine on which resource mapping has not been performed exists in the unmapped virtual machine set Q.

With reference to the first aspect, in a first possible implementation manner, the selecting, from an unmapped virtual machine set Q in the VDC resource request, M virtual machines to form a partition P includes: selecting M virtual machines that minimize a bandwidth requirement of the partition P from the unmapped virtual machine set Q to form the partition P, where the bandwidth requirement refers to a sum of bandwidths of all virtual links that connect all the virtual machines inside the partition P to virtual machines outside the partition P.

With reference to the first aspect, or the first possible implementation manner of the first aspect, in a second possible implementation manner, the selecting a target physical server that can provide a physical resource required by the partition P, and mapping the partition P to the target physical server includes:

step i: selecting, from a physical server set CS, a physical server with a minimum remaining physical link resource capacity as the target physical server, mapping the partition P to the target physical server, and if the mapping fails, performing step ii, where the set CS is a set of physical servers that are in an enabled state, whose remaining physical link resource capacity satisfies the bandwidth requirement of the partition P, and to which a requested virtual machine in the VDC resource request has not been resource-mapped; where optionally, a physical server with lowest CPU performance, least memories, least disks, smallest network, or a minimum remaining capacity of a mappable virtual machine quantity may be further selected as the target physical server; and step ii: if a quantity of the physical servers in the set CS is greater than 1, removing the selected target physical server from the set CS, and returning to step i; or if a quantity of the physical servers in the set CS is 1, progressively decreasing M by 1, and returning to step 204.

With reference to the first aspect, or either of the possible implementation manners of the first aspect, in a third possible implementation manner, the mapping the partition P to the target physical server includes:

mapping a computing resource and a storage resource of each virtual machine in the partition P to the target physical server; and mapping a virtual link between virtual machines in the partition P, and a virtual link between each virtual machine in the partition P and another mapped virtual machine in the virtual machines, in the VDC resource request, on which resource mapping needs to be performed.

With reference to the first aspect, or any one of the possible implementation manners of the first aspect, in a fourth possible implementation manner, the virtual machine distribution identifier includes a user service level, and the service level is used to indicate the maximum quantity K of the virtual machines that are in the VDC resource request and that can be borne by the single physical server.

With reference to the first aspect, or any one of the possible implementation manners of the first aspect, in a fifth possible implementation manner, the virtual machine distribution identifier includes a VM distribution indicator requirement, and the maximum quantity K of the virtual machines that are in the VDC resource request and that can be borne by the single physical server is an integer part of a product of the quantity of the requested virtual machines and the VM distribution indicator requirement.

According to a second aspect, an embodiment of the present disclosure provides a virtual data center VDC resource mapping computing device, which is configured to execute a method according to the first aspect, or any one of the possible implementation manners of the first aspect, and includes a processor, a memory, a bus, and a communications interface, where the memory is configured to store a computing device execution instruction, the processor and the memory are connected using the bus, and when the computing device runs, the processor executes the computing device execution instruction stored in the memory, such that the computing device executes the method according to the first aspect, or any one of the possible implementation manners of the first aspect.

According to a third aspect, an embodiment of the present disclosure provides a virtual data center VDC resource mapping device, including:

a receiving unit 602, configured to receive a VDC resource request, where the VDC resource request carries a quantity of requested virtual machines and a virtual machine distribution identifier, the quantity of the requested virtual machines is used to indicate a total quantity A of virtual machines requested for resource mapping, and the virtual machine distribution identifier is used to indicate a maximum quantity K of virtual machines that are in the VDC resource request, on which resource mapping needs to be performed, and that can be borne by a single physical server; where the VDC resource request includes a virtual machine request, and a virtual machine and physical machine hybrid request;

a selection unit 604, configured to execute the following operations:

operation 612: selecting, from an unmapped virtual machine set Q in the VDC resource request, M virtual machines to form a partition P, where the unmapped virtual machine set Q is a set of virtual machines on which resource mapping has not been performed and that are in the A virtual machines requested for resource mapping, and an initial value of M is a natural number greater than 1 and less than or equal to K; and operation 614: selecting a target physical server that can provide a physical resource required by the partition P; where the physical resource includes at least one of the following: a remaining capacity of a virtual machine that can be borne by a server, a CPU, a magnetic disk, a memory, a network, an operating system, a physical link, and the like;

a mapping unit 606, configured to map the partition P to the target physical server; and a verification unit 608, configured to: remove, from the unmapped virtual machine set Q, the M virtual machines on which the mapping unit 606 has performed resource mapping, and when it is determined that a virtual machine on which resource mapping has not been performed exists in the unmapped virtual machine set Q, instruct the selection unit 604 to execute operation 612.

With reference to the third aspect, in a first possible implementation manner, the selection unit 604 is configured to: select M virtual machines that minimize a bandwidth requirement of the partition P from the unmapped virtual machine set Q to form the partition P, where the bandwidth requirement refers to a sum of bandwidths of all virtual links that connect all the virtual machines inside the partition P to virtual machines outside the partition P.

With reference to the third aspect, or the first possible implementation manner of the third aspect, in a second possible implementation manner, the selection unit 604 is configured to execute the following operations:

operation i: selecting, from a physical server set CS, a physical server with a minimum remaining physical link resource capacity as the target physical server, mapping the partition P to the target physical server, and if the mapping fails, executing operation ii, where the set CS is a set of physical servers that are in an enabled state, whose remaining physical link resource capacity satisfies the bandwidth requirement of the partition P, and to which a requested virtual machine in the VDC resource request has not been resource-mapped; where optionally, a physical server with lowest CPU performance, least memories, least disks, smallest network, or a minimum remaining capacity of a mappable virtual machine quantity may be further selected as the first target physical server;

operation ii: if a quantity of the physical servers in the set CS is greater than 1, removing the selected target physical server from the set CS, and returning to executing operation i; or if a quantity of the physical servers in the set CS is 1, progressively decreasing M by 1, and returning to executing operation 612.

With reference to the third aspect, or either of the possible implementation manners of the third aspect, in a third possible implementation manner, the mapping unit 606 is specifically configured to:

map a computing resource and a storage resource of each virtual machine in the partition P to the target physical server, and map a virtual link between virtual machines in the partition P, and a virtual link between each virtual machine in the partition P and another mapped virtual machine in the virtual machines, in the VDC resource request, on which resource mapping needs to be performed.

With reference to the third aspect, or any one of the possible implementation manners of the third aspect, in a fourth possible implementation manner, the virtual machine distribution identifier includes a user service level, and the service level is used to indicate the maximum quantity K of the virtual machines that are in the VDC resource request and that can be borne by the single physical server.

With reference to the third aspect, or any one of the possible implementation manners of the third aspect, in a fifth possible implementation manner, the virtual machine distribution identifier includes a VM distribution indicator requirement, and the maximum quantity K of the virtual machines that are in the VDC resource request and that can be borne by the single physical server is an integer part of a product of the quantity of the requested virtual machines and the VM distribution indicator requirement.

The technical solutions provided in the present disclosure can implement a function of properly allocating resources in a case of minimizing energy consumption overheads of infrastructure and satisfying reliability, to provide an optimum trade-off among reliability, resource utilization, and system energy consumption overheads.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
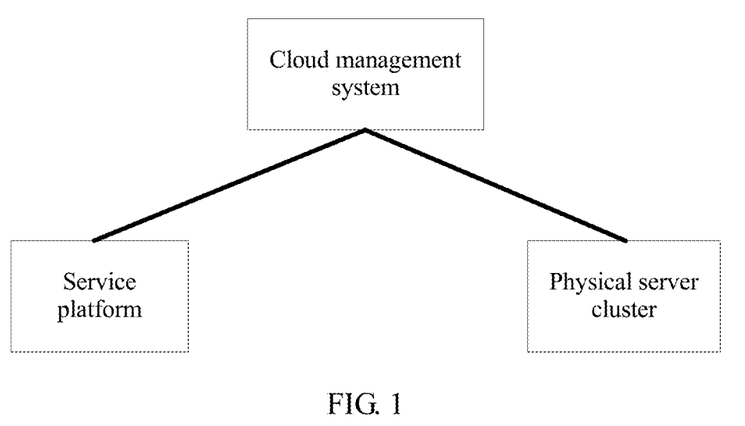
FIG. 1 is a schematic diagram of a logical system structure of an application scenario of a virtual data center resource mapping method according to the present disclosure.

FIG. 1 is a schematic diagram of a logical system structure of an application scenario of a virtual data center resource mapping method according to the present disclosure. As shown in FIG. 1, the system includes a service platform, a cloud management system, and a server cluster.

A user submits a virtual data center (VDC) resource request to the cloud management system using the service platform, such as a web-based service platform. The VDC resource request may include information about a virtual machine VM required by the virtual data center (VDC), for example, a type and a quantity.

The virtual data center (VDC) is an abstraction of a resource set. The virtual data center is a set that includes a computing resource, a storage resource, and a link resource, and can provide a function that has no difference from that of a conventional resource. The virtual data center can provide a new service mode. Different from a conventional virtualization architecture, in a system architecture of the virtual data center, virtualized resources are integrated and managed in a unification manner using a management layer on an existing cloud computing platform, and server virtualization, storage virtualization, and network virtualization are collaboratively applied, such that the service platform provides complete, flexible, and integrated services.

A physical server refers to a real physical server that can support a virtualization function. The physical server may be used to compute a resource or store a resource. After being added to a cloud computing environment, the physical server can be discovered by a cloud computing operation and management platform, and can be allocated to a virtual computing resource pool for management, thereby becoming a virtual computing resource that can be managed and scheduled.

The cloud management system can monitor a running status of each physical server node in real-time, and obtain system information of each physical server node. The system information may include use state information of a device in a physical server node, such as CPU usage, disk usage, memory usage, and the like, and may also include a remaining physical link resource capacity of the physical server node, a quantity of virtual machines mapped by a server, and another load status. Specifically, the cloud management system can obtain the system information of the physical server node by directly querying or parsing a system file in an operating system of the physical server node. For example, when the operating system of the physical server node is a Linux system, a specific file in a proc file system of the Linux system may record the system information of the physical server node. The cloud management system may directly query the specific file in the proc file system, and obtain the system information of the physical server node. In the proc file system, process information, CPU usage, a disk input/output I/O status, memory usage, and the like of each physical node may be obtained. Further, a load status of a virtual machine deployed in a physical node may be obtained from the proc file system, an execution status of a kernel may also be read from the proc file system, and information such as a CPU idle time, CPU system time, and CPU user time may also be obtained from a proc/stat file. The specific file that records the system information of the physical node in the proc file system of the Linux system may be stored in a disk, and may also be stored in a virtual file system in a memory. A method for obtaining, by the cloud management system, the system information of the physical server node in the Linux operating system is merely used as an example for description, and the present disclosure sets no limitation thereto.

Figure 2:
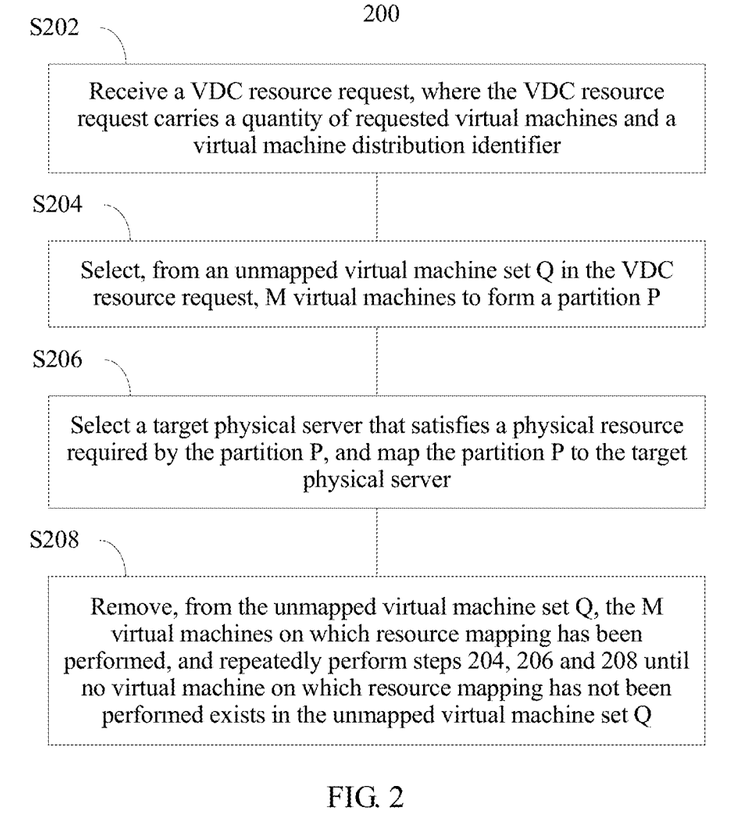
FIG. 2 is an exemplary flowchart of a virtual data center resource mapping method according to an embodiment of the present disclosure.

FIG. 2 is an exemplary flowchart of a virtual data center resource mapping method 200 according to an embodiment of the present disclosure. An application maps a virtual machine inside a virtual data center (VDC) to a physical server. In a specific implementation process, the virtual data center resource mapping method 200 may be executed by a cloud management system and the like.

S202. Receive a VDC resource request, where the VDC resource request carries a quantity of requested virtual machines and a virtual machine distribution identifier, the quantity of the requested virtual machines is used to indicate a total quantity A of virtual machines requested for resource mapping, and the virtual machine distribution identifier is used to indicate a maximum quantity K of virtual machines that are in the VDC resource request, on which resource mapping needs to be performed, and that can be borne by a single physical server.

Optionally, the VDC resource request includes a virtual machine request, and a virtual machine and physical machine hybrid request.

S204. Select, from an unmapped virtual machine set Q in the VDC resource request, M virtual machines to form a partition P.

The unmapped virtual machine set Q is a set of virtual machines on which resource mapping has not been performed and that are in the A virtual machines requested for resource mapping, and an initial value of M is a natural number greater than 1 and less than or equal to K.

S206. Select a target physical server that can provide a physical resource required by the partition P, and map the partition P to the target physical server.

Optionally, the physical resource includes at least one of the following: a remaining capacity of a virtual machine that can be borne by a server, a CPU, a disk, a memory, a network, an operating system, a physical link, and the like.

S208. Remove, from the unmapped virtual machine set Q, the M virtual machines on which resource mapping has been performed, and repeatedly perform steps S204, S206 and S208 until no virtual machine on which resource mapping has not been performed exists in the unmapped virtual machine set Q.

Optionally, the VDC resource request further includes a type of a virtual machine VM required by the virtual data center VDC.

Optionally, the virtual machine distribution identifier may be directly the maximum quantity K of the virtual machines that are in the VDC resource request and that can be borne by the single physical server, and may also indirectly indicate the maximum quantity K of the virtual machines that are in the VDC resource request and that can be borne by the single physical server. The virtual machine distribution identifier may be indicated by a VM distribution indicator requirement R. The VM distribution indicator requirement R is similar to reliability in a conventional sense, and may be specified by a user when submitting the VDC resource request. A parameter model of the VM distribution indicator requirement is:

$$R(i) = \frac{S_i - \max_{j \in S} \mu_{i,j} \cdot S_{i,j}}{S_i} \qquad \text{formula 1}$$

R(i) indicates a VM distribution indicator requirement of an $i^{th}$ VDC, and $S_i$ indicates a total quantity of VMs in the $i^{th}$ VDC. $\mu_{i,j}$ is a binary variable. When a value is 1, indicates that a VM is deployed in a server j of the $i^{th}$ VDC; when the value is 0, $\mu_{i,j}$ indicates that no VM is deployed in the server j of the $i^{th}$ VDC. $S_{i,j}$ indicates a quantity of VMs deployed in the server j of the $i^{th}$ VDC.

It can be learned from (formula 1) that, a maximum quantity of VMs that are in a resource request of the $i^{th}$ VDC and that can be borne by a single physical server is:

$$K = \lfloor (1-R(i)) \cdot S_i \rfloor \qquad \text{formula 2}$$

A symbol $\lfloor \ \rfloor$ indicates round down to the nearest integer.

Optionally, the virtual machine distribution identifier may be further indicated by a user service level. The user service level is determined when a user signs a service level agreement (Service Level Agreement, SLA for short), and may also be selected by the user when the user submits the VDC resource request. The user service level may directly determine the maximum quantity of VMs that are in the VDC resource request and that can be borne by a single server, and may also be corresponding to the VM distribution indicator requirement R. The correspondence thereof is predefined by a data center operator. That is, the virtual machine distribution identifier may be but is not limited to the VM distribution indicator requirement R, the user service level, or information indicating the user service level, such as a user identifier.

Optionally, the selecting, from an unmapped virtual machine set Q in the VDC resource request, M virtual machines to form a partition P includes: selecting M virtual machines that minimize a bandwidth requirement of the partition P from the unmapped virtual machine set Q to form the partition P, where the bandwidth requirement refers to a sum of bandwidths of all virtual links that connect all the virtual machines inside the partition P to virtual machines outside the partition P.

Optionally, the selecting a target physical server that can provide a physical resource required by the partition P, and mapping the partition P to the target physical server includes:

step i: selecting, from a physical server set CS, a physical server with a minimum remaining physical link resource capacity as the target physical server, mapping the partition P to the target physical server, and if the mapping fails, performing step ii, where the set CS is a set of physical servers that are in an enabled state, whose remaining physical link resource capacity satisfies the bandwidth requirement of the partition P, and to which a requested virtual machine in the VDC resource request has not been resource-mapped, and the remaining physical link resource capacity refers to a bandwidth capacity that can be provided by an unallocated physical link in a physical server, where optionally, a physical server with lowest CPU performance, least memories, least disks, smallest network, or a minimum remaining capacity of a mappable virtual machine quantity may be further selected as the first target physical server;

step ii: if a quantity of the physical servers in the set CS is greater than 1, removing the selected target physical server from the set CS, and returning to step i; or if a quantity of the physical servers in the set CS is 1, progressively decreasing M by 1, and returning to step S204.

Optionally, the mapping the partition P to the target physical server includes:

mapping a computing resource and a storage resource of each virtual machine in the partition P to the target physical server; and mapping a virtual link between virtual machines in the partition P, and a virtual link between each virtual machine in the partition P and another mapped virtual machine in the virtual machines, in the VDC resource request, on which resource mapping needs to be performed.

Optionally, the virtual machine distribution identifier includes a user service level, and the service level is used to indicate the maximum quantity K of the virtual machines that are in the VDC resource request and that can be borne by the single physical server.

Optionally, the virtual machine distribution identifier includes a VM distribution indicator requirement, and the maximum quantity K of the virtual machines that are in the VDC resource request and that can be borne by the single physical server is an integer part of a product of the quantity of the requested virtual machines and the VM distribution indicator requirement.

Figure 3:
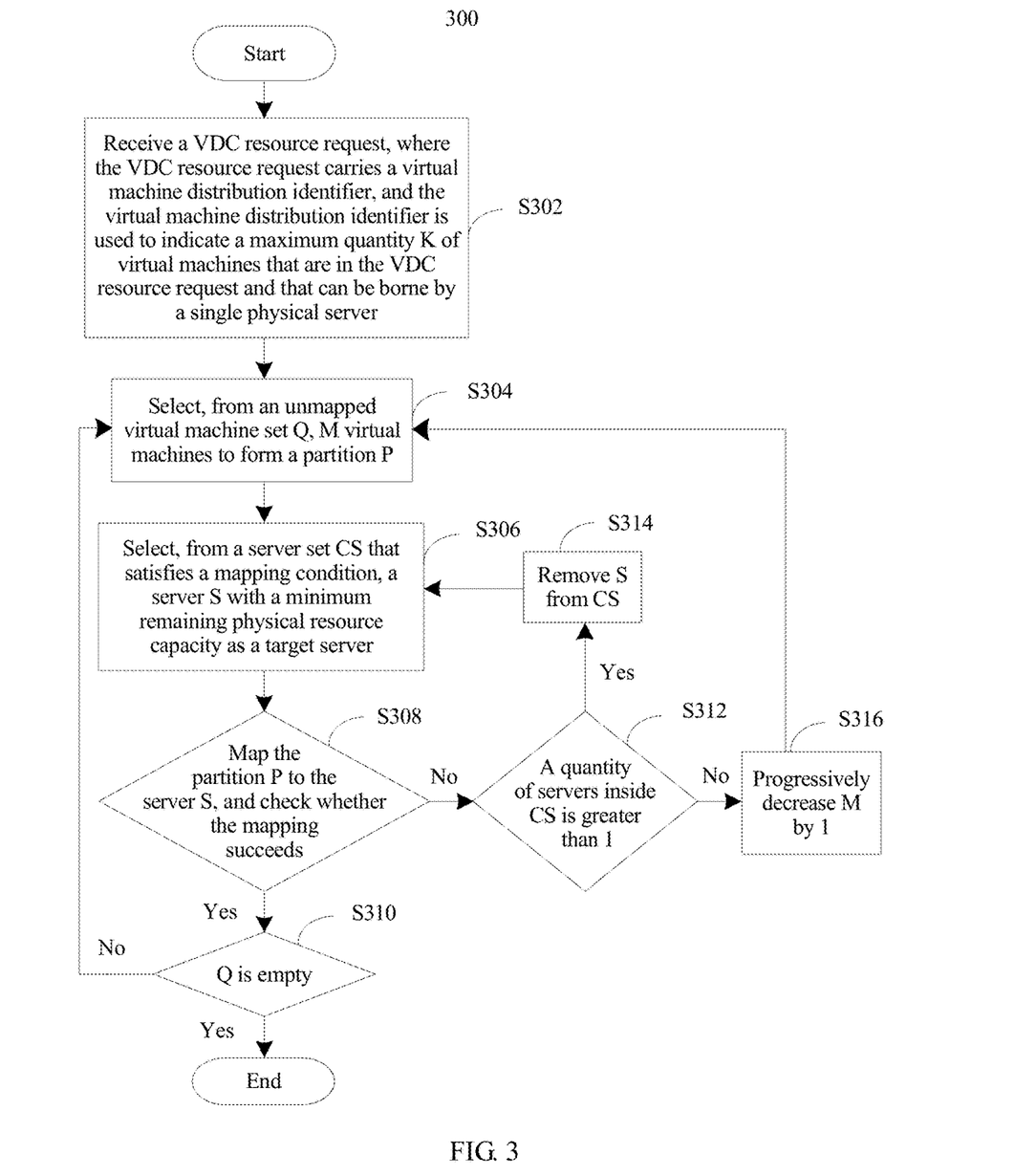
FIG. 3 is an exemplary flowchart of a virtual data center resource mapping method according to an embodiment of the present disclosure.

FIG. 3 is an exemplary flowchart of a virtual data center resource mapping method 300 according to an embodiment of the present disclosure. As shown in FIG. 3, the method is specifically as follows:

S302. Receive a VDC resource request, where the VDC resource request carries a quantity of requested virtual machines and a virtual machine distribution identifier, the quantity of the requested virtual machines is used to indicate a total quantity A of virtual machines requested for resource mapping, and the virtual machine distribution identifier is used to indicate a maximum quantity K of virtual machines that are in the VDC resource request, on which resource mapping needs to be performed, and that can be borne by a single physical server.

Optionally, the VDC resource request includes a virtual machine request, and a virtual machine and physical machine hybrid request.

Optionally, the VDC resource request further includes a type of a virtual machine VM required by the virtual data center VDC. The virtual machine distribution identifier may be directly the maximum quantity K of the virtual machines that are in the VDC resource request and that can be borne by the single physical server, and may also indirectly indicate the maximum quantity K of the virtual machines that are in the VDC resource request and that can be borne by the single physical server. The virtual machine distribution identifier may be but is not limited to a VM distribution indicator requirement R, a user service level, or information indicating the user service level, such as a user identifier. The user service level may directly determine the maximum quantity of VMs that are in the VDC resource request and that can be borne by a single server, and may also be corresponding to the VM distribution indicator requirement R. The correspondence thereof is predefined by a data center operator.

Figure 4:
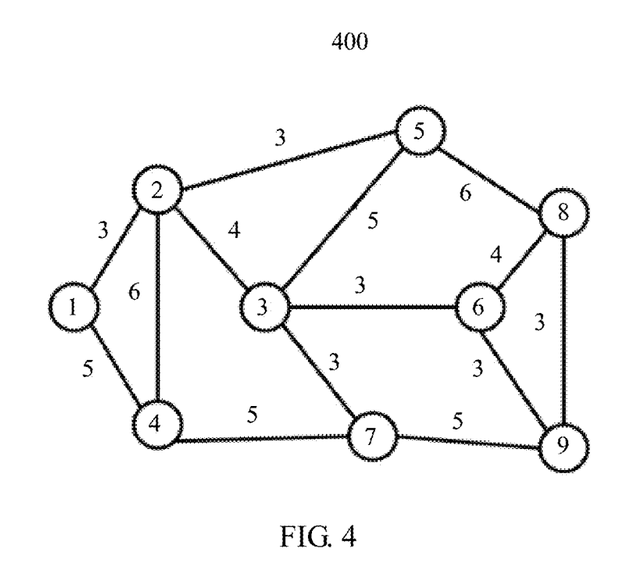
FIG. 4 is a schematic diagram of a logical structure of a virtual data center according to an embodiment of the present disclosure.

In an optional specific embodiment, a user submits a VDC resource request on a Web-based interface. A schematic diagram of a logical structure of the VDC resource request is shown in FIG. 4. Each node indicates a virtual machine, and a connection line between the nodes indicates a virtual link between the virtual machines. A value near the connection line is used to indicate bandwidth that the virtual link needs to consume, and a larger value indicates greater consumption of the bandwidth required by the virtual link. As shown in FIG. 4, a total quantity of virtual machines in the VDC resource request is S=9.

Optionally, when the user submits the VDC resource request, a selected user service level is Normal, and a VM distribution indicator requirement R of the Normal user service level specified by a cloud management system background is 67%. Because the total quantity S of virtual machines S=9, it may be learned that the maximum quantity K of the virtual machines that can be borne by a single physical server is K=(1−R)S=3.

S304. Select, from an unmapped virtual machine set Q in the VDC resource request, M virtual machines to form a partition P, where the unmapped virtual machine set Q is a set of virtual machines on which resource mapping has not been performed and that are in the A virtual machines requested for resource mapping, and an initial value of M is a natural number greater than 1 and less than or equal to K.

Optionally, the initial value of M may be set to K, and may also be set to a value less than K. A value of M changes with a subsequent step. In this embodiment, in an exemplary solution, the initial value of M is set to K.

If the value of M is greater than a quantity of virtual machines in the set Q in a method execution process, the value of M is set again to the quantity of the virtual machines in the set Q.

Optionally, quality of the partition P may be indicated by a symbol OB. The quality OB of the partition may be indicated by formula 3 as follows:

$$OB = \sum_{u \in P, v \in N} BW(u, v) + \sum_{u \in p, v \in Q} BW(u, v) \quad \text{formula 3}$$

P indicates the partition P, N indicates a set of virtual machines that have been successfully mapped, and Q is a set of remaining virtual machines that are not mapped after the partition P and the set N are removed. BW(u,v) indicates a bandwidth requirement of a virtual link between a virtual machine u and an adjacent virtual machine v. Physical interpretation of OB indicates the sum of bandwidth requirements of all virtual links that connect all VMs inside P to VMs inside N and Q. A smaller value of OB indicates a smaller bandwidth required by the VMs of the partition P for connecting to VMs outside the partition P. Because combined deployment of these VMs can reduce as many bandwidth requirements between servers as possible, and reduce energy consumption of a switch, the partition P is of better quality. Likewise, a larger value of OB indicates that the partition is of poorer quality.

Figure 5:
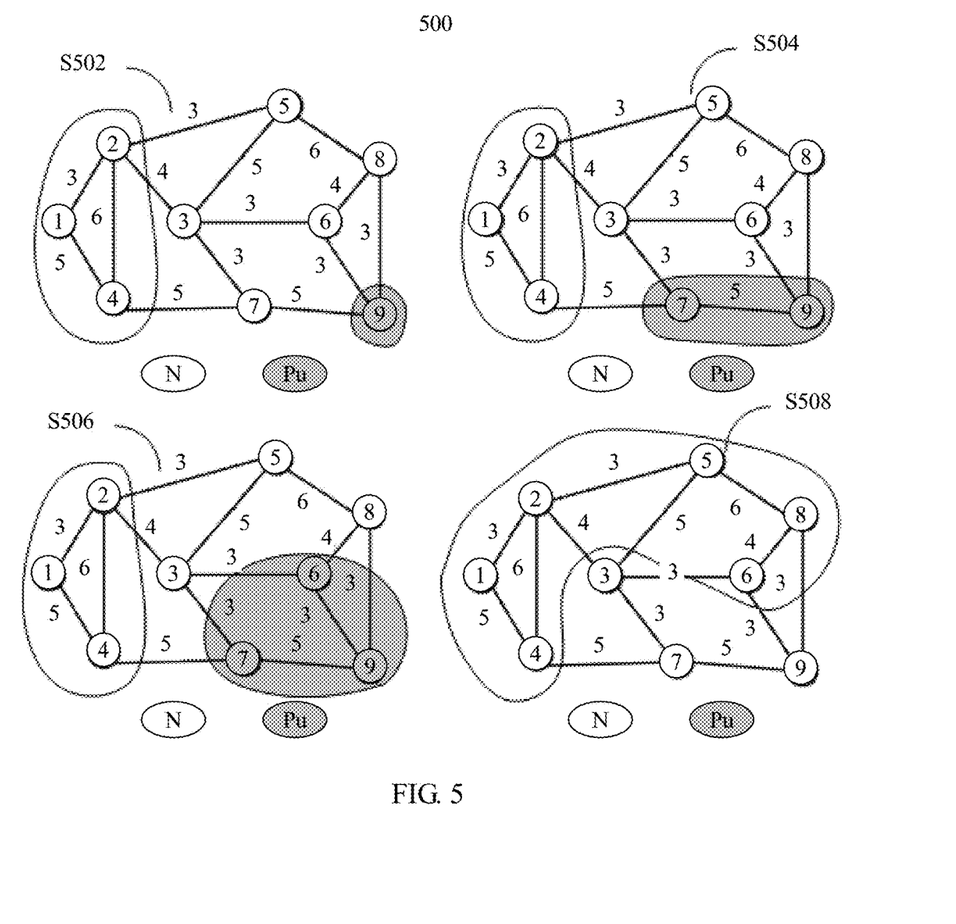
FIG. 5 is a schematic diagram of a process of selecting a partition P for virtual machine mapping of a virtual data center according to an embodiment of the present disclosure.

Optionally, a method for finding out the partition P may be: traversing virtual machines VMu in the unmapped virtual machine set Q, calculating an alternative partition Pu starting from VMu using greedy graph growing partitioning (Greedy Graph Growing Partitioning, GGGP for short), and finding out and using a partition with a minimum value of OB from all alternative partitions Pu as the final partition P. A specific implementation process is shown in FIG. 5. The partition N indicates the set of the virtual machines that have been successfully mapped, and the partition Pu indicates a partition obtained by calculation using the GGGP algorithm.

As shown in FIG. 5, three steps S502, S504, and S506 describe a process of calculating an alternative partition Pu. It can be learned from FIG. 5 that the unmapped virtual machine set Q={3,5,6,7,8,9}.

S502. This algorithm starts with a node 9. In this case, the alternative partition Pu={9}.

S504. An alternative node adjacent to the node 9 includes nodes 6, 7, and 8. A gain of the node 7 is the maximum, and the node 7 is added to the alternative partition Pu. In this case, the alternative partition Pu={7, 9}. A gain of a node indicates, when a node moves from a partition in which the node is located to another partition, a decrement of a bandwidth required by VMs inside a partition for connecting to VMs outside the partition outside the partition.

S506. In this case, a new node adjacent to the node 7 includes nodes 3 and 4. The node 4 is a mapped node. Therefore, only the node 3 is considered. A node with a maximum gain is selected from optional nodes 3, 6 and 8 that are adjacent to the partition Pu. The node 6 is selected herein, and the node 6 is added to the alternative partition Pu. In this case, the alternative partition Pu={6, 7, 9}. Because a quantity of partition nodes has reached the maximum quantity K of the virtual machines that can be borne by a single physical server, the partition algorithm of this round ends.

S508. Traverse virtual machines in the set Q, obtain all alternative partitions Pu by calculation using the GGGP algorithm according to steps S502, S504, and S506, and select, from all the alternative partitions Pu, a partition with a minimum value of OB as the final partition P, where P={5, 6, 8} herein.

That the partition P is found out using the GGGP algorithm is merely used as an example for description, and the present disclosure sets no limitation thereto.

S306. Select, from a physical server set CS, a physical server S with a minimum remaining physical link capacity as a target physical server, where the set CS is a set of physical servers that are in an enabled state, whose physical link resource satisfies a bandwidth requirement of the partition P, and to which a requested virtual machine in the VDC resource request has not been resource-mapped.

In this embodiment of the present disclosure, each server can be mapped to one partition at most regardless of a size of the partition. If one partition has been deployed in one server, it is considered that the server has been used in a current VDC mapping process, and the server is not considered again in a subsequent mapping process.

Optionally, a set US of unused and enabled servers is obtained first in the current VDC mapping process. A server i∈US is checked using OB of the partition, to check whether a remaining physical link resource pl between the server i and a data center TOR switch connected to the server i can satisfy an OB requirement. If the remaining physical link resource pl can satisfy the OB requirement, i is added to a candidate server set CS. Then, an obtained server inside CS is arranged according to a remaining physical link bandwidth capacity, and the physical server S with a minimum remaining physical link capacity is selected as a mapping server of the partition P. A method for determining the set CS and sorting the servers inside the set CS using the remaining physical link capacity is merely used as an example for description, and the present disclosure sets no limitation thereto.

Optionally, except a remaining physical link of a server, the server set CS may be further determined using another remaining physical resource of the server. The physical resource includes at least one of the following: a remaining capacity of a virtual machine that can be borne by a server, a CPU, a disk, a memory, a network, an operating system, a physical link, and the like. Likewise, the foregoing process of sorting the CS may also be performed in a different manner, which includes but is not limited to: a quantity of virtual machines borne by a current server, CPU usage, disk usage, memory usage, network usage, and the like.

It should be pointed out that, because the determining of the server set CS is merely performed from a perspective that remaining physical resources of partial servers satisfy mapping, the server set CS is merely a preliminary filtering result, and does not represent that all servers inside the server set CS can be successfully mapped by the partition P. If a server inside the CS fails to map the partition P in a subsequent mapping process, it indicates that the server does not satisfy a mapping condition, and the server should be removed from the set CS.

S308. Map the partition P to a target server S. If the mapping succeeds, perform step S310; or if the mapping fails, perform step S312.

Optionally, the mapping the partition P to a target physical server S includes: mapping a computing resource and storage resource of each virtual machine in the partition P to the target physical server S.

Optionally, after the partition P is successfully mapped to the server S, a virtual link between virtual machines in the partition P and a virtual link between each virtual machine in the partition P and another mapped virtual machine in the virtual machines, in the VDC resource request, on which resource mapping needs to be performed are further mapped, and a physical resource required by the virtual link between each virtual machine in the partition P and a virtual machine in the unmapped virtual machine set Q is reserved.

S310. Remove, from the unmapped virtual machine set Q, M virtual machines on which resource mapping has been performed, and determine whether the unmapped virtual machine set Q is empty. If Q is empty, it indicates that all virtual machines in the VDC request are successfully mapped, and the mapping ends; or if Q is not empty, return to step 304.

S312. Determine whether a quantity of virtual machines inside the server set CS is greater than 1. If the quantity of virtual machines is greater than 1, perform step S314; or if the quantity of virtual machines is not greater than 1, perform step S318.

S314. Remove the server S from the server set CS, and return to step S306.

Because the partition P fails to map to the server S, it indicates that the server S does not satisfy a mapping condition of the partition P. However, the server set CS indicates a virtual machine set that satisfies the mapping condition, the server S should be removed from the set CS. A server with a second to minimum remaining physical link capacity in the original set CS becomes a server S with a minimum remaining physical link capacity in a new CS set (in this embodiment, the determining of the set CS and the sorting of servers inside the set CS are performed using the remaining physical link capacity).

S316. Progressively decrease M by 1, and return to step 304.

Because the quantity of virtual machines inside the server set CS is not greater than 1, it indicates that the server S that fails to map the partition P is the unique server inside the set CS, and the current partition P is the partition with the minimum value of OB in a partition that includes M virtual machines in the unmapped virtual machine set Q. The mapping failure of the partition P indicates that all partitions that include M virtual machines may fail in mapping. Therefore, M is progressively decreased, and step 304 is performed again to re-determine the partition P.

Optionally, in the mapping process, if the mapping still fails after M is progressively decreased to 1, one or more new physical servers are enabled to serve as the target physical server according to a quantity of remaining virtual machines in the set Q. The virtual machines in the set Q may be directly mapped to the newly enabled server, or a value of M is set to K again, and step S304 is performed again until all the virtual machines in the set Q are mapped to the newly enabled target physical server. If enabling a new server fails, all servers in a data center have been enabled, and the VDC mapping is considered failed.

The technical solution provided in this embodiment enables proper resource allocation in a case of minimizing energy consumption overheads of infrastructure, to provide an optimum trade-off between resource utilization and system energy consumption overheads.

Figure 6:
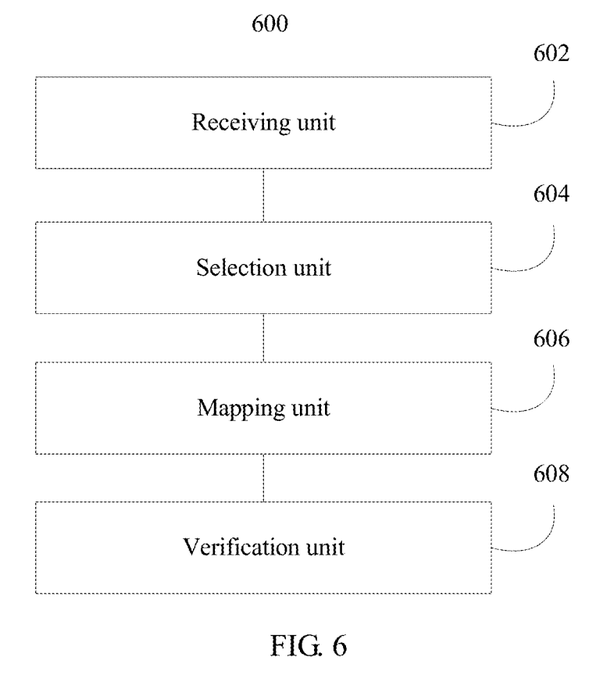
FIG. 6 is a schematic diagram of a logical structure of a virtual data center resource mapping device according to an embodiment of the present disclosure.

FIG. 6 is a schematic diagram of a logical structure of a virtual data center resource mapping device 600 according to an embodiment of the present disclosure. As shown in FIG. 6, the device 600 includes a receiving unit 602, a selection unit 604, a mapping unit 606, and a verification unit 608.

The receiving unit 602 is configured to receive a VDC resource request, where the VDC resource request carries a quantity of requested virtual machines and a virtual machine distribution identifier, the quantity of the requested virtual machines is used to indicate a total quantity A of virtual machines requested for resource mapping, and the virtual machine distribution identifier is used to indicate a maximum quantity K of virtual machines that are in the VDC resource request, on which resource mapping needs to be performed, and that can be borne by a single physical server.

Optionally, the VDC resource request includes a virtual machine request, and a virtual machine and physical machine hybrid request.

Optionally, the VDC resource request further includes a type of a virtual machine VM required by the virtual data center VDC. The virtual machine distribution identifier may be directly the maximum quantity K of the virtual machines that are in the VDC resource request and that can be borne by the single physical server, and may also indirectly indicate the maximum quantity K of the virtual machines that are in the VDC resource request and that can be borne by the single physical server. The virtual machine distribution identifier may be but is not limited to the VM distribution indicator requirement R, the user service level, or information indicating the user service level, such as a user identifier. The user service level may directly determine the maximum quantity of VMs that are in the VDC resource request and that can be borne by a single server, and may also be corresponding to the VM distribution indicator requirement R. The correspondence thereof is predefined by a data center operator.

The selection unit 604 is configured to execute the following operations:

operation 612: selecting, from an unmapped virtual machine set Q in the VDC resource request, M virtual machines to form a partition P, where the unmapped virtual machine set Q is a set of virtual machines on which resource mapping has not been performed and that are in the A virtual machines requested for resource mapping, and an initial value of M is a natural number greater than 1 and less than or equal to K; and operation 614: selecting a target physical server that can provide a physical resource required by the partition P.

Optionally, the physical resource includes at least one of the following: a remaining capacity of a virtual machine that can be borne by a server, a CPU, a disk, a memory, a network, an operating system, a physical link, and the like.

The mapping unit 606 is configured to map the partition P to the target physical server.

The verification unit 608 is configured to: remove, from the unmapped virtual machine set Q, the M virtual machines on which the mapping unit 606 has performed resource mapping, and when it is determined that a virtual machine on which resource mapping has not been performed exists in the unmapped virtual machine set Q, instruct the selection unit 604 to execute operation 612.

Optionally, the selection unit 604 is configured to: select M virtual machines that minimize a bandwidth requirement of the partition P from the unmapped virtual machine set Q to form the partition P, where the bandwidth requirement refers to a sum of bandwidths of all virtual links that connect all the virtual machines inside the partition P to virtual machines outside the partition P.

Optionally, the selection unit 604 is configured to execute the following operations:

operation i: selecting, from a physical server set CS, a physical server with a minimum remaining physical link resource capacity as the target physical server, mapping the partition P to the target physical server, and if the mapping fails, executing operation ii, where the set CS is a set of physical servers that are in an enabled state, whose remaining physical link resource capacity satisfies the bandwidth requirement of the partition P, and to which a requested virtual machine in the VDC resource request has not been resource-mapped; and operation ii: if a quantity of the physical servers in the set CS is greater than 1, removing the selected target physical server from the set CS, and returning to executing operation i; or if a quantity of the physical servers in the set CS is 1, progressively decreasing M by 1, and returning to executing operation 612.

Optionally, the mapping unit 606 is specifically configured to: map a computing resource and a storage resource of each virtual machine in the partition P to the target physical server, and map a virtual link between virtual machines in the partition P, and a virtual link between each virtual machine in the partition P and another mapped virtual machine in the virtual machines, in the VDC resource request, on which resource mapping needs to be performed.

Optionally, the virtual machine distribution identifier includes a user service level, and the service level is used to indicate the maximum quantity K of the virtual machines that are in the VDC resource request and that can be borne by the single physical server.

Optionally, the virtual machine distribution identifier includes a VM distribution indicator requirement, and the maximum quantity K of the virtual machines that are in the VDC resource request and that can be borne by the single physical server is an integer part of a product of the quantity of the requested virtual machines and the VM distribution indicator requirement.

Figure 7:
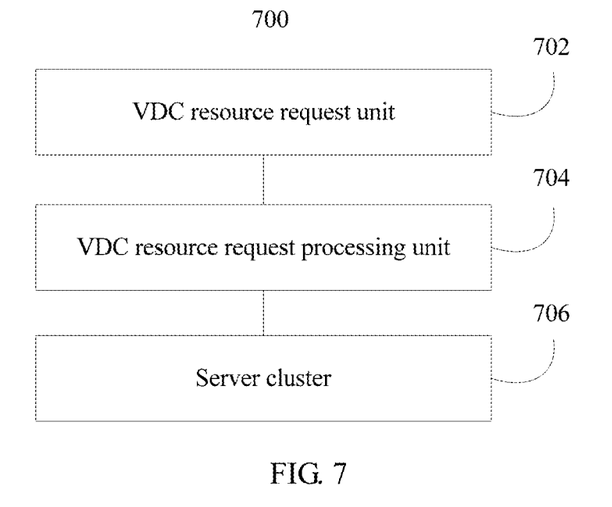
FIG. 7 is a schematic structural diagram of a virtual data center resource mapping system according to an embodiment of the present disclosure.

FIG. 7 is a schematic structural diagram of a virtual data center resource mapping system 700 according to an embodiment of the present disclosure. As shown in FIG. 7, the system 700 includes a VDC resource request unit 702, a VDC resource request processing unit 704, and a server cluster 706.

The VDC resource request unit 702 is configured to send a virtual data center VDC resource request, where the VDC resource request carries a virtual machine distribution identifier, and the virtual machine distribution identifier is used to indicate a maximum quantity K of virtual machines that are in the VDC resource request and that can be borne by a single physical server.

Optionally, the VDC resource request includes a virtual machine request, and a virtual machine and physical machine hybrid request.

Optionally, the VDC resource request further includes a type and a quantity of virtual machines VMs required by the virtual data center VDC. The virtual machine distribution identifier may be directly the maximum quantity K of the virtual machines that are in the VDC resource request and that can be borne by the single physical server, and may also indirectly indicate the maximum quantity K of the virtual machines that are in the VDC resource request and that can be borne by the single physical server. The virtual machine distribution identifier may be but is not limited to the VM distribution indicator requirement R, the user service level, or information indicating the user service level, such as a user identifier. The user service level may directly determine the maximum quantity of VMs that are in the VDC resource request and that can be borne by a single server, and may also be corresponding to the VM distribution indicator requirement R. The correspondence thereof is predefined by a data center operator.

The VDC resource request processing unit 704 is configured to execute the following operations.

Operation 712: Receive the VDC resource request.

Operation 714: Select, from an unmapped virtual machine set Q in the VDC resource request, M virtual machines to form a partition P.

The unmapped virtual machine set Q is a set of virtual machines on which resource mapping has not been performed and that are in the A virtual machines requested for resource mapping, and an initial value of M is a natural number greater than 1 and less than or equal to K.

Operation 716: Select a target physical server that can provide a physical resource required by the partition P, and map the partition P to the target physical server.

Optionally, the physical resource includes at least one of the following: a remaining capacity of a virtual machine that can be borne by a server, a CPU, a disk, a memory, a network, an operating system, a physical link, and the like.

Operation 718: Remove, from the unmapped virtual machine set Q, the M virtual machines on which resource mapping has been performed by the mapping unit 606, and when it is determined that a virtual machine on which resource mapping has not been performed exists in the unmapped virtual machine set Q, instruct the selection unit 704 to execute operation 714.

The server cluster 706 includes at least one physical server. The physical server is configured to map the virtual machine in the VDC resource request.

Optionally, when executing operation 714, the VDC resource request processing unit 704 is specifically configured to: select M virtual machines that minimize a bandwidth requirement of the partition P from the unmapped virtual machine set Q to form the partition P, where the bandwidth requirement refers to a sum of bandwidths of all virtual links that connect all the virtual machines inside the partition P to virtual machines outside the partition P.

Optionally, when executing operation 716, the VDC resource request processing unit 704 is specifically configured to execute the following operations: operation i: selecting, from a physical server set CS, a physical server with a minimum remaining physical link resource capacity as the target physical server, mapping the partition P to the target physical server, and if the mapping fails, executing operation ii, where the set CS is a set of physical servers that are in an enabled state, whose remaining physical link resource capacity satisfies the bandwidth requirement of the partition P, and to which a requested virtual machine in the VDC resource request has not been resource-mapped; and operation ii: if a quantity of the physical servers in the set CS is greater than 1, removing the selected target physical server from the set CS, and returning to executing operation i; or if a quantity of the physical servers in the set CS is 1, progressively decreasing M by 1, and returning to executing operation 714.

Optionally, the VDC resource request processing unit 704 is further configured to: map a computing resource and a storage resource of each virtual machine in the partition P to the target physical server, and map a virtual link between virtual machines in the partition P, and a virtual link between each virtual machine in the partition P and another mapped virtual machine in the virtual machines, in the VDC resource request, on which resource mapping needs to be performed.

Optionally, the virtual machine distribution identifier includes a user service level, and the service level is used to indicate the maximum quantity K of the virtual machines that are in the VDC resource request and that can be borne by the single physical server.

Optionally, the virtual machine distribution identifier includes a VM distribution indicator requirement, and the maximum quantity K of the virtual machines that are in the VDC resource request and that can be borne by the single physical server is an integer part of a product of the quantity of the requested virtual machines and the VM distribution indicator requirement.

Figure 8:
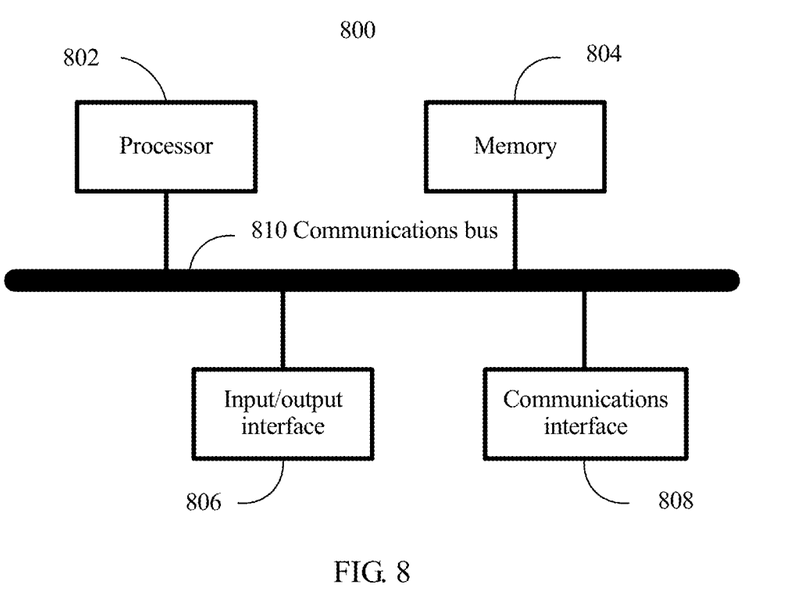
FIG. 8 is a schematic diagram of a hardware structure of a virtual data center resource mapping system according to an embodiment of the present disclosure.

FIG. 8 is a schematic diagram of a hardware structure of a computing device 800 according to an embodiment of the present disclosure. As shown in FIG. 8, the computing device 800 includes a processor 802, a memory 804, an input/output interface 806, a communications interface 808, and a bus 810. The processor 802, the memory 804, the input/output interface 806, and the communications interface 808 implement mutual communications connections using the bus 810.

The processor 802 may be a general central processing unit (Central Processing Unit, CPU), a microprocessor, an application-specific integrated circuit (Application Specific Integrated Circuit, ASIC), or one or more integrated circuits, and is configured to execute a related program, so as to implement technical solutions provided in the embodiments of the present disclosure.

The memory 804 may be a read-only memory (Read Only Memory, ROM), a static storage device, a dynamic storage device, or a random access memory (Random Access Memory, RAM). The memory 804 may store an operating system and another application program. When the technical solutions provided in the embodiments of the present disclosure are implemented by software or firmware, program code used to implement the technical solutions provided in the embodiments of the present disclosure is stored in the memory 804, and is executed by the processor 802.

The input/output interface 806 is configured to receive inputted data and information, and output data, such as an operation result.

The communications interface 808 is but is not limited to a transceiver apparatus such as a transceiver, to implement communication between the computing device 800 and another device or a communications network.

The bus 810 may include a channel, to transfer information between parts (such as the processor 802, the memory 804, the input/output interface 806, and the communications interface 808) of the computing device 800.

It should be noted that, although for the computing device 800, merely the processor 802, the memory 804, the input/output interface 806, the communications interface 808, and the bus 810 are shown in FIG. 8, in a specific implementation process, a person skilled in the art should understand that the computing device 800 further includes another device required for implementing normal running. In addition, a person skilled in the art should understand that, according to a specific requirement, the computing device 800 may further include a hardware device that implements another additional function. In addition, a person skilled in the art should understand that the computing device 800 may also merely include a device required for implementing the embodiments of the present disclosure, and there is no need to include all devices shown in FIG. 8.

The hardware structure shown in FIG. 8 and the foregoing description are applicable to various virtual data center resource mapping devices and systems provided in the embodiments of the present disclosure, and are applicable to executing various virtual data center methods provided in the embodiments of the present disclosure.

In the several embodiments provided in this application, it should be understood that the disclosed system, device, and method may be implemented in other manners. For example, the described apparatus embodiment is merely exemplary. For example, the module division is merely logical function division and may be other division in implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module. The integrated module may be implemented in a form of hardware, or may be implemented in a form of hardware in addition to a software functional module.

When the foregoing integrated module is implemented in a form of a software functional module, the integrated unit may be stored in a computer-readable storage medium. The software functional module is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A virtual data center (VDC) resource mapping method, comprising:
   a) receiving a VDC resource request, wherein the VDC resource request carries a quantity of requested virtual machines and a virtual machine distribution identifier, the quantity of the requested virtual machines is used to indicate a total quantity A of virtual machines requested for resource mapping, and the virtual machine distribution identifier is used to indicate a maximum quantity K of virtual machines that can be borne by a single physical server;
   b) selecting, from an unmapped virtual machine set Q in the VDC resource request, M virtual machines to form a partition P; wherein:
   the unmapped virtual machine set Q is a set of virtual machines on which resource mapping has not been performed, and an initial value of M is a natural number greater than 1 and less than or equal to K;
   c) selecting a target physical server that can provide a physical resource required by the partition P, and mapping the partition P to the target physical server; and
   d) removing, from the unmapped virtual machine set Q, the M virtual machines on which resource mapping has been performed, and repeatedly performing steps b), c), and d) until no virtual machine exists in the unmapped virtual machine set Q.

2. The method according to claim 1, wherein the selecting,
   from an unmapped virtual machine set Q in the VDC resource request, M virtual machines to form a partition P comprises: selecting M virtual machines that minimize a bandwidth requirement of the partition P from the unmapped virtual machine set Q to form the partition P, wherein the bandwidth requirement includes a sum of bandwidths of all virtual links that connect all the virtual machines inside the partition P to virtual machines outside the partition P.

3. The method according to claim 2, wherein the selecting a target physical server that can provide a physical resource required by the partition P, and mapping the partition P to the target physical server comprises:
   i: selecting, from a physical server set CS, a physical server with a minimum remaining physical link resource capacity as the target physical server, mapping the partition P to the target physical server, wherein the set CS is a set of physical servers that are in an enabled state, whose remaining physical link resource capacity satisfies the bandwidth requirement of the partition P, and to which a requested virtual machine in the VDC resource request has not been resource-mapped; and when the mapping fails:

ii: removing the selected target physical server from the set CS and returning to step i when a quantity of the physical servers in the set CS is greater than 1; decreasing M by 1 and returning to step b) when a quantity of the physical servers in the set CS is 1.

4. The method according to claim 1, wherein the mapping the partition P to the target physical server comprises:

mapping a computing resource and a storage resource of each virtual machine in the partition P to the target physical server; and mapping a virtual link between virtual machines in the partition P, and a virtual link between each virtual machine in the partition P and another mapped virtual machine on which resource mapping needs to be performed.

5. The method according to claim 1, wherein the virtual machine distribution identifier comprises a user service level, and the service level is used to indicate the maximum quantity K of the virtual machines that are in the VDC resource request and that can be borne by the single physical server.

6. The method according to claim 1, wherein the virtual machine distribution identifier comprises a VM distribution indicator requirement, and the maximum quantity K of the virtual machines that are in the VDC resource request and that can be borne by the single physical server is an integer part of a product of the quantity of the requested virtual machines and the VM distribution indicator requirement.

7. A computing device, comprising:

a memory configured to store instructions; and a processor coupled to the memory and configured to execute the instructions to:

a) receive a virtual data center (VDC) resource request, wherein the VDC resource request carries a quantity of requested virtual machines and a virtual machine distribution identifier, the quantity of the requested virtual machines is used to indicate a total quantity A of virtual machines requested for resource mapping, and the virtual machine distribution identifier is used to indicate a maximum quantity K of virtual machines that can be borne by a single physical server;

b) select, from an unmapped virtual machine set Q in the VDC resource request, M virtual machines to form a partition P; wherein:

the unmapped virtual machine set Q is a set of virtual machines on which resource mapping has not been performed, and an initial value of M is a natural number greater than 1 and less than or equal to K;

c) select a target physical server that can provide a physical resource required by the partition P, and map the partition P to the target physical server; and d) remove, from the unmapped virtual machine set Q, the M virtual machines on which resource mapping has been performed, and repeatedly perform steps b), c), and d) until no virtual machine exists in the unmapped virtual machine set Q.

8. The device according to claim 7, wherein the processor is configured to select M virtual machines that minimize a bandwidth requirement of the partition P from the unmapped virtual machine set Q to form the partition P, wherein the bandwidth requirement includes a sum of bandwidths of all virtual links that connect all the virtual machines inside the partition P to virtual machines outside the partition P.

9. The device according to claim 8, wherein the processor is configured to:

i: select, from a physical server set CS, a physical server with a minimum remaining physical link resource capacity as the target physical server, mapping the partition P to the target physical server, wherein the set CS is a set of physical servers that are in an enabled state, whose remaining physical link resource capacity satisfies the bandwidth requirement of the partition P, and to which a requested virtual machine in the VDC resource request has not been resource-mapped; and when the mapping fails:

ii: remove the selected target physical server from the set CS and return to step i when a quantity of the physical servers in the set CS is greater than 1; decrease M by 1 and return to step b) when a quantity of the physical servers in the set CS is 1.

10. The device according to claim 7, wherein the processor is configured to:

map a computing resource and a storage resource of each virtual machine in the partition P to the target physical server; and map a virtual link between virtual machines in the partition P.

11. The device according to claim 7, wherein the virtual machine distribution identifier comprises a user service level, and the service level is used to indicate the maximum quantity K of the virtual machines that are in the VDC resource request and that can be borne by the single physical server.

12. The device according to claim 7, wherein the virtual machine distribution identifier comprises a VM distribution indicator requirement, and the maximum quantity K of the virtual machines that are in the VDC resource request and that can be borne by the single physical server is an integer part of a product of the quantity of the requested virtual machines and the VM distribution indicator requirement.

13. A system, comprising a mapping device and multiple physical servers, wherein the mapping device is configured to:

a) receive a virtual data center (VDC) resource request, wherein the VDC resource request carries a quantity of requested virtual machines and a virtual machine distribution identifier, the quantity of the requested virtual machines is used to indicate a total quantity A of virtual machines requested for resource mapping, and the virtual machine distribution identifier is used to indicate a maximum quantity K of virtual machines that can be borne by a single physical server;

b) select, from an unmapped virtual machine set Q in the VDC resource request, M virtual machines to form a partition P; wherein:

the unmapped virtual machine set Q is a set of virtual machines on which resource mapping has not been performed, and an initial value of M is a natural number greater than 1 and less than or equal to K;

c) select a target physical server that can provide a physical resource required by the partition P from the multiple physical servers, and map the partition P to the target physical server; and d) remove, from the unmapped virtual machine set Q, the M virtual machines on which resource mapping has been performed, and repeatedly perform steps b), c), and d) until no virtual machine exists in the unmapped virtual machine set Q.

14. The system according to claim 13, wherein the mapping device is configured to select M virtual machines that minimize a bandwidth requirement of the partition P from the unmapped virtual machine set Q to form the partition P, wherein the bandwidth requirement refers to a sum of bandwidths of all virtual links that connect all the virtual machines inside the partition P to virtual machines outside the partition P.

15. The system according to claim 13, wherein the mapping device is configured to:
   i: select, from a physical server set CS, a physical server with a minimum remaining physical link resource capacity as the target physical server, mapping the partition P to the target physical server, wherein the set CS is a set of physical servers that are in an enabled state, whose remaining physical link resource capacity satisfies the bandwidth requirement of the partition P, and to which a requested virtual machine in the VDC resource request has not been resource-mapped; and when the mapping fails:
   ii: remove the selected target physical server from the set CS and return to step i when a quantity of the physical servers in the set CS is greater than 1; decrease M by 1 and return to step b) when a quantity of the physical servers in the set CS is 1.

16. The system according to claim 13, wherein the mapping device is configured to:
   map a computing resource and a storage resource of each virtual machine in the partition P to the target physical server; and
   map a virtual link between virtual machines in the partition P.

17. The system according to claim 13, wherein the virtual machine distribution identifier comprises a user service level, and the service level is used to indicate the maximum quantity K of the virtual machines that are in the VDC resource request and that can be borne by the single physical server.

18. The system according to claim 13, wherein the virtual machine distribution identifier comprises a VM distribution indicator requirement, and the maximum quantity K of the virtual machines that are in the VDC resource request and that can be borne by the single physical server is an integer part of a product of the quantity of the requested virtual machines and the VM distribution indicator requirement.

* * * * *